(12) United States Patent
Nimri et al.

(10) Patent No.: US 6,771,302 B1
(45) Date of Patent: Aug. 3, 2004

(54) VIDEOCONFERENCE CLOSED CAPTION SYSTEM AND METHOD

(75) Inventors: Alain Nimri, Austin, TX (US); Jeff Ratcliff, Austin, TX (US)

(73) Assignee: Polycom, Inc., Milpitas, CA (US)

( * ) Notice: Subject to any disclaimer, the term of this patent is extended or adjusted under 35 U.S.C. 154(b) by 0 days.

(21) Appl. No.: 10/219,607

(22) Filed: Aug. 14, 2002

Related U.S. Application Data
(60) Provisional application No. 60/312,364, filed on Aug. 14, 2001.

(51) Int. Cl.[7] ............................................. H04N 7/14
(52) U.S. Cl. ................... 348/14.08; 348/14.09
(58) Field of Search ................... 348/14.01–14.08, 348/14.09, 14.11–14.13; 709/204; 345/753, 758; 379/202.01

(56) References Cited

U.S. PATENT DOCUMENTS 5,793,365 A * 8/1998 Tang et al. ................. 345/758
6,442,590 B1 * 8/2002 Inala et al. ................. 709/204
6,510,206 B2 * 1/2003 Engelke et al. ............. 379/52
6,628,767 B1 * 9/2003 Wellner et al. ......... 379/202.01
2001/0013890 A1 * 8/2001 Narayanaswami ....... 348/14.01
2002/0069069 A1 * 6/2002 Kanevsky et al. .......... 704/271

OTHER PUBLICATIONS
Moncreiff; Computer Network Chat Room . . . in Real-Time; May 22, 1998, WO 98/21644.*

* cited by examiner

*Primary Examiner*—Melur Ramakrishnaiah
(74) *Attorney, Agent, or Firm*—Wong, Cabello, Lutsch, Rutherford & Brucculeri, L.L.P.

(57) ABSTRACT

A system and method for closed caption in a videoconference environment. In a method according to one embodiment of the present invention, a connection is established with a videoconference device. Subsequently, a closed caption page associated with the videoconference device is selected. Text is then entered on the closed caption page. The text is displayed to at least one device associated with a videoconference in which the videoconference device is participating.

21 Claims, 7 Drawing Sheets

VIDEOCONFERENCE CLOSED CAPTION SYSTEM AND METHOD

CROSS-REFERENCES TO RELATED APPLICATIONS

The present application claims priority of Provisional Patent Application Serial No. 60/312,364 filed, Aug. 14, 2001 and entitled "Videoconference Closed Caption System and Method," which is incorporated herein by reference in its entirety.

BACKGROUND OF THE INVENTION

1. Field of the Invention

The present invention relates generally to the field of videoconference systems, and more particularly to a videoconference closed caption system and method.

2. Background of the Invention

Videoconferencing is increasingly becoming a widely utilized tool allowing for meetings between groups of,people, both large and small. Businesses frequently engage in videoconferences for facilitating meetings between other businesses, employees at different office locations, and the like. Seminars, educational courses, etc. are also often conducted via videoconference.

The aforementioned meetings traditionally occur in some type of conference room or hall. Conventionally, participants who are hearing impaired or speak a foreign language rely upon some type of interpreter to communicate content of the meeting. Typically, the interpreter stands near a front portion of the conference room. Disadvantageously, this location may be difficult for participants to view depending on size of the conference room, number of participants, location of the participants, etc.

In a videoconferencing environment, a camera may focus on a group of participants, or on a particular individual speaking at a given time. Providing the interpreter at videoconferences for the hearing impaired, foreign speakers, etc. is not effective, since the camera typically does not focus on the interpreter for extended periods of time. Furthermore, the interpreter may be difficult to view, depending on the aim, focus, etc. of the camera at any given time during the meeting.

Referring now to FIG. 1, a prior art videoconference system is shown. A first videoconference device 162 communicates with a remote videoconference device 104 via a network 106. Optionally, a computer 108 may be coupled to the first videoconference device 102 and a computer 110 may be coupled to the remote videoconference device 104 for introducing various types of information into the videoconference between the first videoconference device 102 and the remote videoconference device 104.

Prior art videoconference systems, like the videoconference system of FIG. 1, are not capable of providing interpretations services for the hearing impaired, foreign speakers, etc. As previously discussed, cameras utilized in prior art videoconference system typically do not focus on the interpreter for extended periods of time. Further, prior art videoconference systems are not capable of providing other types of interpretation of discussions occurring during a videoconference.

Accordingly, there is a need for interpretation of meeting content in a videoconference in a clear and efficient manner that does not interfere with conducting the videoconference, itself.

SUMMARY OF THE INVENTION

The present invention provides in various embodiments a system and method for videoconference closed captioning.

In a method according to one embodiment of the present invention, a connection is established with a videoconference device. A closed caption page associated with the videoconference device is selected. Text is then entered on the closed caption page. The text is displayed to at least one device associated with a videoconference in which the videoconference device is participating.

In a system according to one embodiment of the present invention, the system facilitates videoconference closed captioning. A closed caption entry device is configured to establish a connection with a videoconference device, to select a closed caption page associated with the videoconference device, and to enter text on the closed caption page. A closed caption engine associated with the videoconference device is configured to receive the text and to prepare the text for transmission. A display medium is configured to display the text to at least one device associated with a videoconference in which the videoconference device is participating.

A further understanding of the nature and advantages of the inventions herein may be realized by reference to the remaining portions of the specification and the attached drawings.

DESCRIPTION OF THE EXEMPLARY EMBODIMENTS

Figure 1:
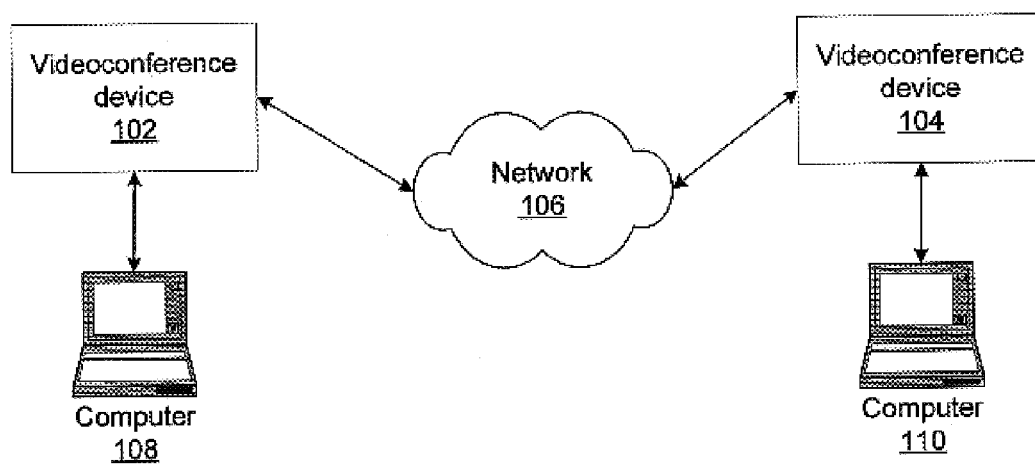
FIG. 1 is a system showing two prior art videoconference devices communicating with one another via a network.

As shown in the exemplary drawings wherein like reference numerals indicate like or corresponding elements among the figures, an embodiment of a system according to the present invention will now be described in detail. The following description sets forth an example of a system and method for providing closed captioning in a videoconference environment.

Figure 2:
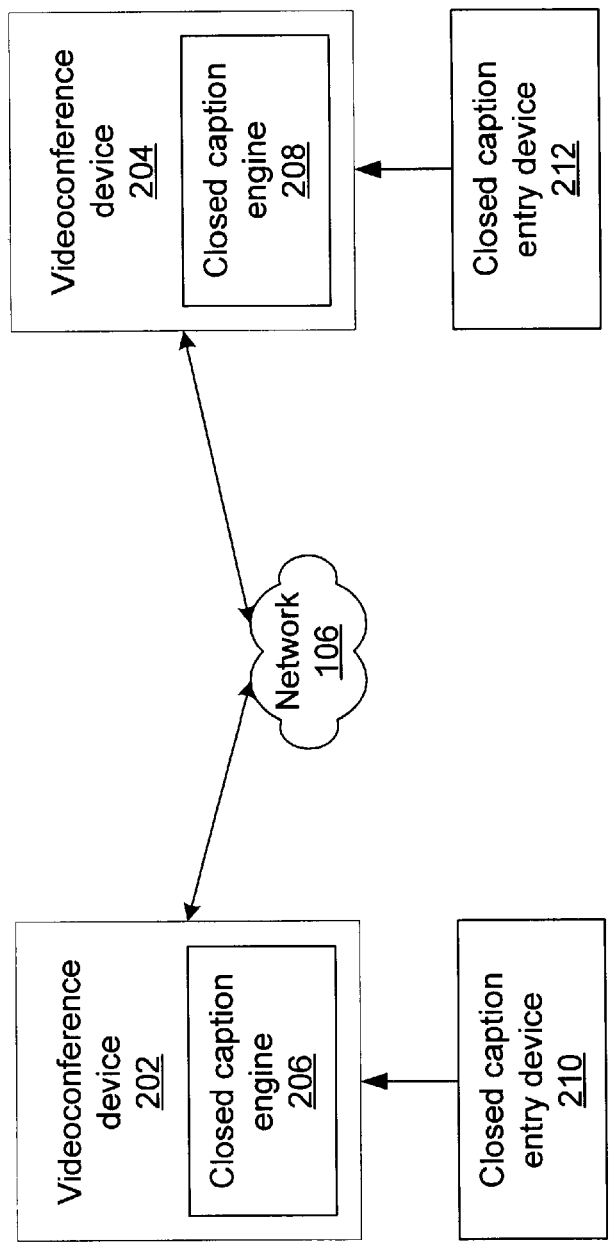
FIG. 2 is an exemplary videoconference system in accordance with the present invention.

Referring now to FIG. 2, an exemplary videoconference system in accordance; with the present invention is shown. A first videoconference device 202 communicates with one or more remote videoconference devices 204 via a network 106. The network 106 may be a wide area network (WAN), a local area network (LAN), etc. The first videoconference device 202 and the one or more remote videoconference devices 204 include closed caption engines 206, 208 (respectively). Further, a first closed caption entry device 210 may be coupled to the first videoconference device 202 and/or a second closed caption entry device 212 may be coupled to the remote videoconference device 204.

Although FIG. 2 shows one closed caption entry device 210, 212 coupled to each videoconference device 202, 204, as an alternative, any number of closed caption entry devices 210, 212 or none at all may be coupled to each videoconference device 202, 204. These closed caption entry devices 210, 212 may be coupled to the first videoconference device 202 and the one or more remote videoconference devices 204 via a network, etc. The closed caption entry device 210, 212 may be a computer aided transcription device, such as a computer aided real-time translator (C.A.R.T), a personal digital assistant (PDA), a generic personal computer, etc.

In one embodiment, the closed caption entry devices 210, 212 are directly coupled to the videoconference devices 202, 204. In this embodiment, a closed caption text entry may be accessed directly, without entering an IP address. In accordance with the present invention, multiple videoconference devices may be in communication with one another and/or to multiple other types of devices. Further, multiple closed caption entry devices, such as closed caption entry devices 210 and 212, may be coupled to a single videoconference device. In one embodiment, multiple videoconference devices in communication with one another are not coupled to a closed caption entry device at all. In this embodiment, a third party closed caption entry device user listens in on the videoconference and provides closed caption text entry services. In another embodiment, a single closed caption entry device is coupled to one videoconference device and provides closed caption entry to all videoconference devices.

In practice, a user at videoconference device 202 places a call to the one or more remote videoconference devices 204, for example. In order to launch the closed caption feature, the IP address of the user's videoconference device 202 is entered in a field of a web browser of the closed caption entry device 210. A web page associated with the videoconferenrce device 202 will appear and the user can access an associated closed caption page. Once the user selects the closed caption page, the user can begin entering text into a current field. The text is then displayed to the remote videoconference devices 204 participating in the videoconference, as well as other devices in or out of the videoconference call. For example, the text may be displayed to the first videoconference device 202, a computing device, a personal digital assistant (PDA), etc.

Closed caption entry device 210 can transcribe for both the first videoconference device 202 and the one or more remote videoconference devices 204. Alternatively, closed caption entry device 210 can transcribe for the first videoconference device 202, closed caption entry device 212 transcribing for the one or more remote videoconference devices 204. Further, the closed captioning process of the present invention may be employed in or out of a videoconference call (e.g., in an audio conference call). Further details of the closed caption process will be discussed below.

Figure 3:
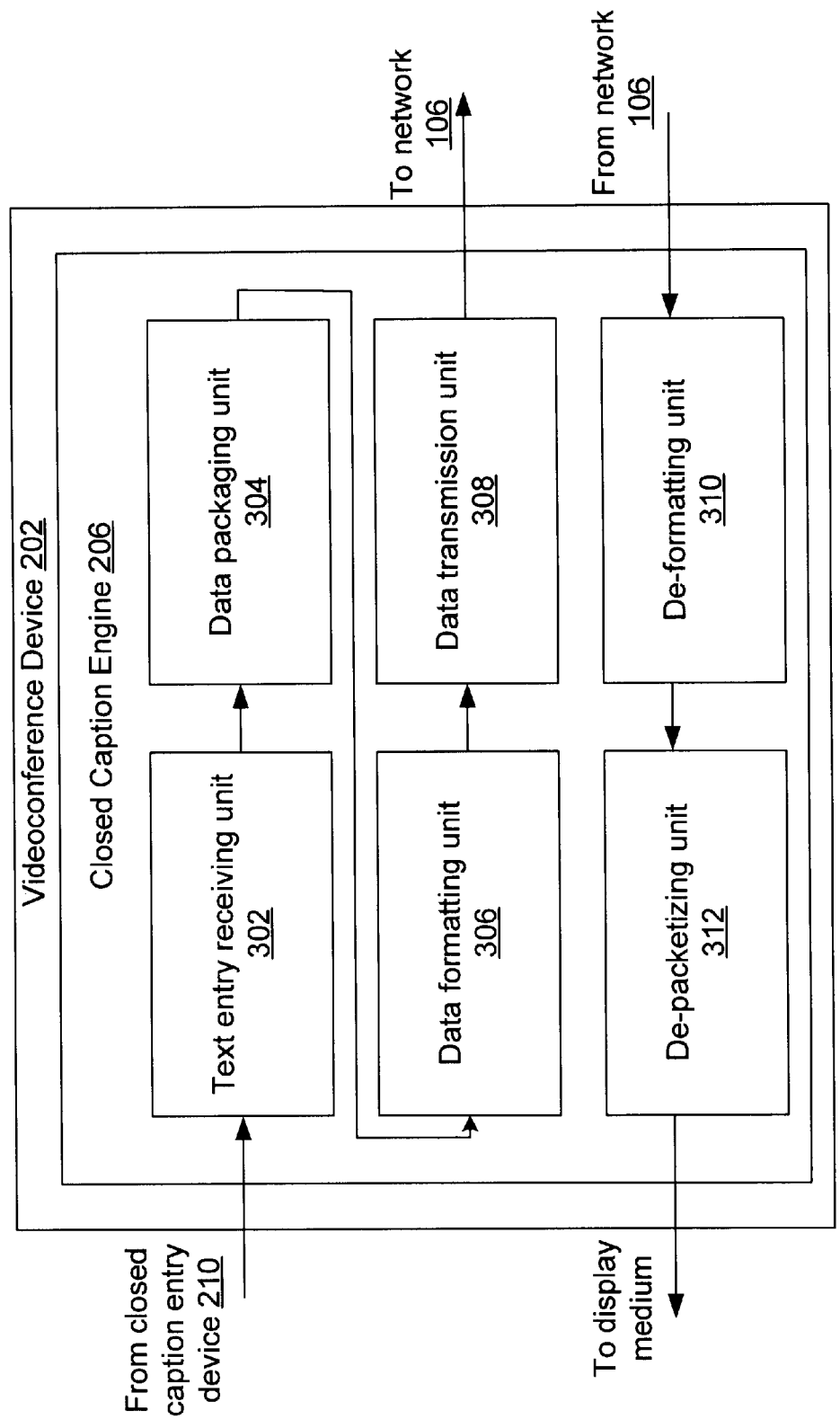
FIG. 3 is an exemplary closed caption engine architecture.

Referring now to FIG. 3, an exemplary architecture of the first videoconference device 202 and the closed caption engine 206 coupled thereto is shown. The closed caption engine 206 includes a text entry receiving unit 302, a data packaging unit 304, a data formatting unit 306 and a data transmission unit 308. The closed caption engine 206 may include additional units (not shown) for receiving input and preparing data for output.

Initially, text data from the closed caption entry device 210 is received by the text entry receiving unit 302. Once the text data is received, the text data is forwarded to the data packaging unit 304 for packetization. After packetization, the text data packets are formatted by the data formatting unit 306. Next, the data formatting unit 306 forwards the text data via a data channel. For instance, the text data may be forwarded via an MLP channel. However, any channel suitable for use with the present invention may be utilized. The text data is transmitted along the same communication channel as audio and video streams (i.e., the audio and video streams associated with the videoconference) in one embodiment. The data transmission unit 308 transmits the data to remote videoconference devices, such as the one or more remote videoconference devices 204, via the network 106. In one embodiment, the data is transmitted utilizing H.221 transport protocol. However, the data may be transmitted via any protocol suitable for use with the present invention One or more remote videoconference devices 204 then receive the data from the network 106. As exemplified by the closed caption engine 206 in FIG. 3, once received, the data is de-formatted by a de-formatting unit 310. A de-packetizing unit 312 then de-packetizes the data. The data is then rendered on a display medium.

Figure 4:
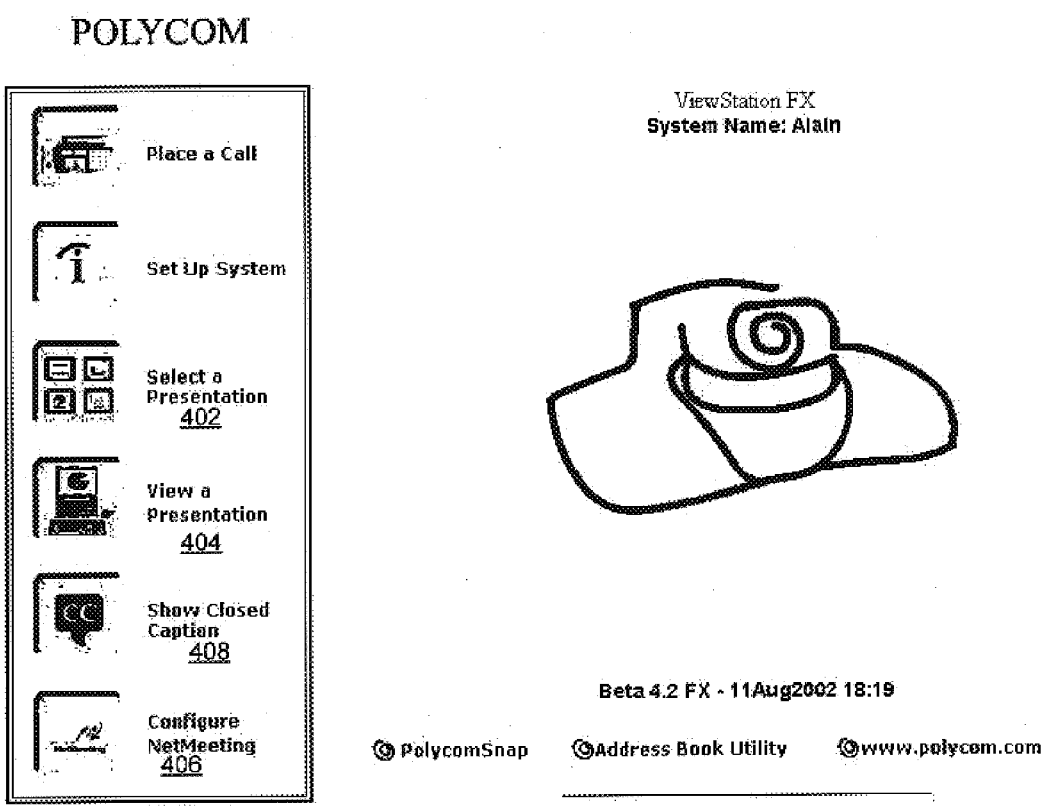
FIG. 4 is a screen shot representing a closed caption option in accordance with an embodiment of the present invention.

Referring now to FIG. 4, a screen shot representing the web page associated with a particular videoconference device in accordance with an embodiment of the present invention is shown. As previously discussed, a user accesses this web page by entering the IP address of the particular videoconference device. A user interface allows the user to select from various options. For example, the user may select a presentation 402, view a presentation 404, configure NetMeeting 406, etc. Various options may be chosen, as shown in FIG. 4. Additional options may be included and/or options may be deleted in accordance with the present invention. Further, the user may select a closed caption option 408 in order to provide closed captioning for a specific audience. When the user selects the closed caption option, a closed caption text entry page is displayed for receiving closed caption text.

In one embodiment, the user is required to input a user name before engaging in the videoconference or accessing the closed caption option. The user may also be required to input a password. This password may be assigned to the specific user name or alternatively, a password may be assigned to a specific meeting. Thus, in order for the user to input text for closed captioning related to the specific meeting, the user is required to input the meeting password. Additionally, the user may have the option of determining whether a password is set for the specific meeting, or is otherwise required, by accessing a "user setup" screen.

Figure 5:
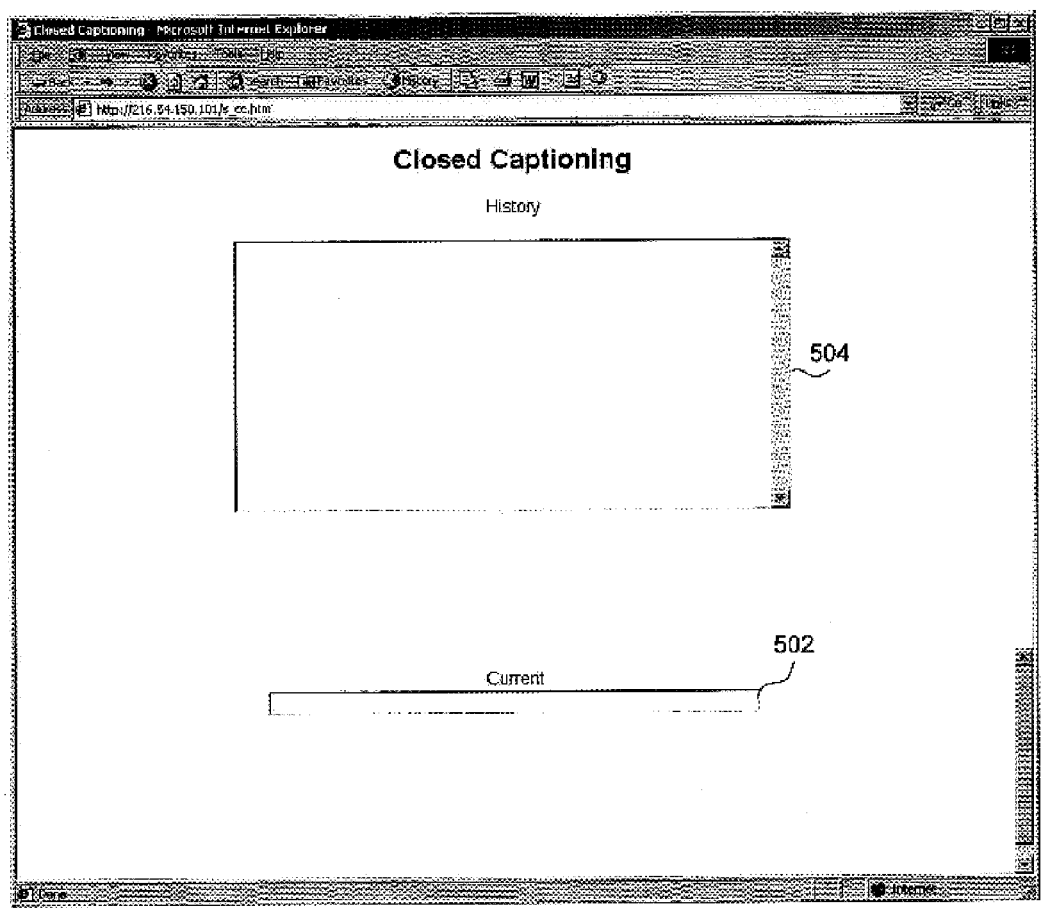
FIG. 5 is an exemplary text entry box for entering closed caption text from a user.

Referring now to FIG. 5, exemplary text boxes for entering closed caption text are shown. A current text entry box 502 receives a most recent set of text for display on at least one device associated with the videoconference, such as the videoconference device 202 shown in FIG. 2. Further, a closed caption "history" text box 504 displays text that is entered and displayed during the videoconference up to and including the text in the current text entry box 502. Thus, the history text box 404 includes a summary of meeting discussion and content, as interpreted and/or translated for closed caption.

According to one exemplary embodiment, the user enters text into the current text entry box 502 via the closed caption entry device (closed caption entry device 210 (FIG. 2), in this example). When the user hits an enter or similar button on the screen or on the closed caption entry device 210, the text that is entered in the current text entry box 502 is displayed in the history text box 504. Further, by hitting the enter button, the text in the current text entry box 502 is also displayed to one or more devices associated with the videoconference (e.g., remote videoconference devices 204). In one embodiment, the message is displayed on the screens of the local and remote meeting sites for 15 seconds. Alternatively, the text may be displayed on the screens associated with the videoconference devices (e.g. remote videoconference devices 204) until additional text is entered into the current text entry box 502. However, the text may be displayed for any length of time suitable for use with the present invention.

Figure 6:
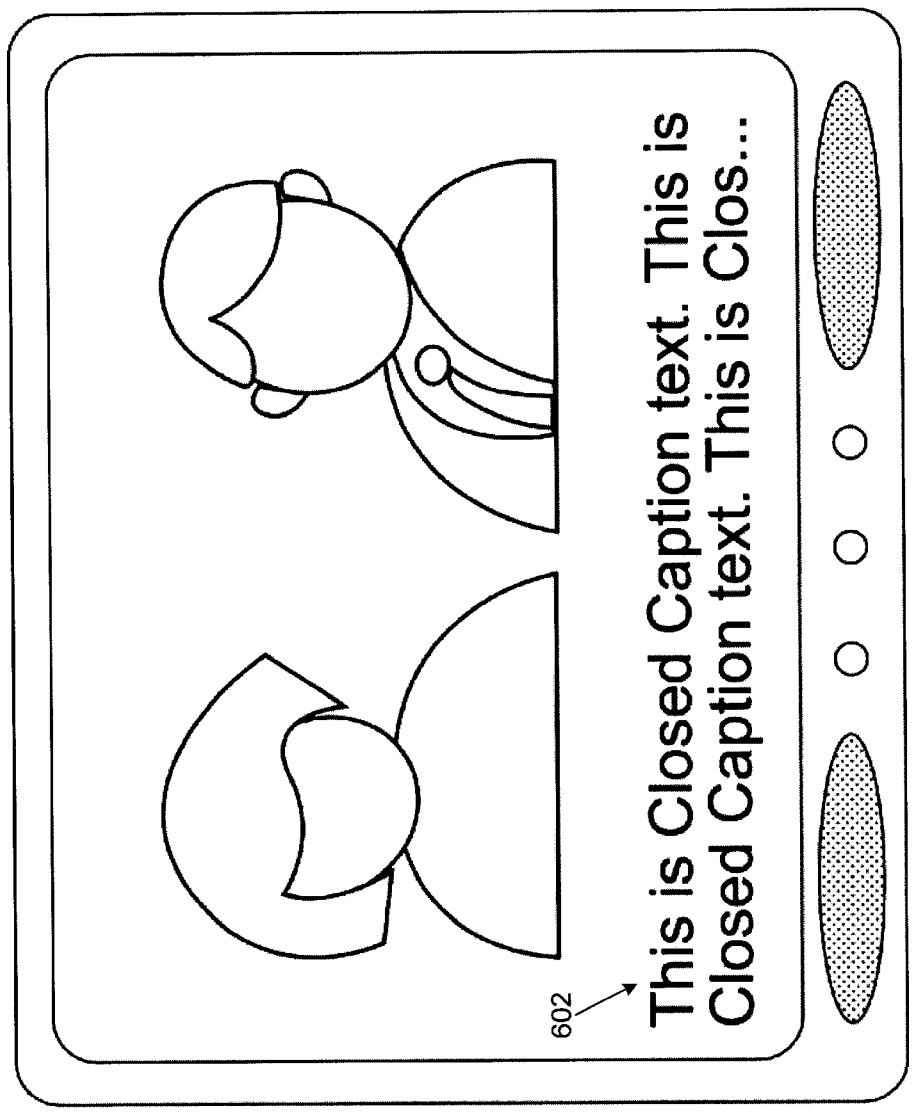
FIG. 6 is an exemplary videoconference screen including closed captioning text.

Referring now to FIG. 6, an exemplary videoconference screen including closed captioning is shown. A video of the environment, such as a conference room or office, for example, at a remote location is shown. Closed captioning text appears on the videoconference screens, or other display associated with the videoconference devices, at the first and/or one or more remote videoconference devices. The closed captioning text 602 in FIG. 6 states "This is Closed Caption text." The closed caption text may indicate that a meeting is about to begin, for example, by greeting participants "Ladies and gentlemen, welcome to the conference." Whatever conversations occur during the meeting will be indicated on the screens of users via closed captioning. For instance, if the next statement that occurs after the greeting is "Location one, can you hear us ok?," closed captioning mirroring these words would also appear on the screens of users.

Users at the local location and/or the remote location may enter closed captioning text. For example, prior to the meeting, a person may be designated, hired, etc. to enter text for all discussions occurring at the meeting. Alternatively, each location may assign, hire, etc. a separate person for their location to enter text for discussions at that location only.

In one embodiment, a user at each remote location and a user at a local location are each separately entering closed caption text from discussions occurring at their relative locations. The text entered by the user at each location may be uniquely identified as text entered from that particular location. For example, the text from the local and the remote locations may differ in color. In such an embodiment, the color difference may be colorblind friendly, such as light text and black text for instance. The text may alternatively indicate from which location it originates by a preceding name of a person, phrase, etc. For example, the text may be introduced by a phrase such as "Location 1: Welcome to the meeting. Location 2: Can you hear us ok location 1?" The text may be associated with the particular location in any manner suitable for use with the present invention.

According to a further embodiment of the present invention, the user may access a closed caption advanced option page. The advanced option page may include various options related to the text and display thereof. For instance, the user may choose the font size, style, color, length of display time, number of lines to be displayed at a time, location of text on the screen and language. However, any options associated with the closed caption text may be selected, or otherwise adjusted, as is suitable with the present invention.

In one embodiment, closed caption text is displayed on a screen 3–4 lines at a time. Additionally, fewer or more than 3–4 lines may be displayed at a time. For instance, in a meeting where many locations are participating and various discussions are potentially occurring close together, more than 3–4 lines of closed captioning text display may be desirable.

Similarly, where each location possesses extremely large display monitors, more than 3–4 lines maybe displayed at a time. Conversely, where one or more locations have small display monitors, displaying less than 3–4 lines of closed caption text at a time may be desirable. Any number of lines of closed captioning text may be displayed as is suitable for use with the present invention.

As discussed herein, the closed caption text may appear anywhere on the display as is suitable for use with the present invention. Optionally, a particular location may disable the closed caption option on the videoconference device associated with the particular location. Thus, participants at a particular location can essentially "turn off" the closed caption feature so that text does not appear on the display(s) associated with their videoconference device.

Figure 7:
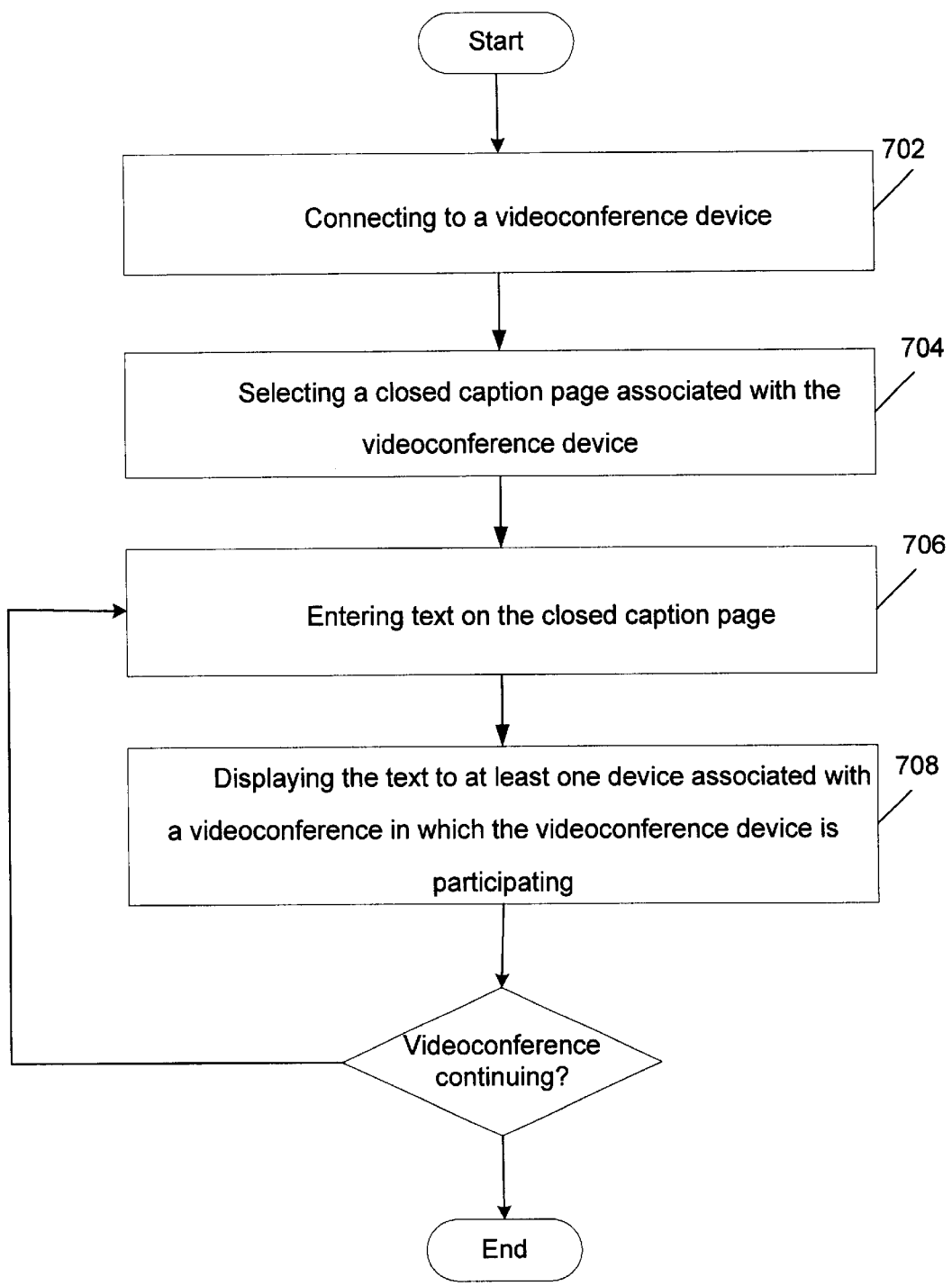
FIG. 7 is an exemplary flowchart of a process for closed captioning in a videoconference environment.

Referring now to FIG. 7, a flowchart of a process for closed captioning in a videoconference environment is provided. At step 702, connection with a videoconference device is established. In order to establish this connection, a closed caption entry device, such as closed caption entry device 210 (FIG. 2), enters an IP address associated with a particular videoconference device, such as videoconference device 202 or the one or more remote videoconference devices 204. A web page associated with the particular videoconference device and IP address entered is displayed. At step 704, a closed caption page associated with the videoconference device is selected. This closed caption page option is displayed on the web page and can be selected along with various other options. Next, the text is entered on the closed caption page at step 706 (by the closed caption entry device).

At step 708, the text is displayed to at least one device associated with a videoconference in which the videoconference device is participating. For example, the text may be displayed to the local videoconference device, such as the first videoconference device 202, and/or to the one or more remote videoconference devices 204. The text may also be displayed to third party devices associated with one or more of the remote videoconference devices 202, 204. For instance, the text may be forwarded to a personal digital assistant (PDA). If the videoconference continues, text continues to be entered on the closed caption page at step 706, and the text continues to be displayed at step 708 until the videoconference ends.

In one embodiment, the closed caption text can be displayed on a third party device. For instance, the closed caption text can be displayed on a PDA of a third party user. Alternatively, the closed caption can be displayed on any third party application suitable for use with the present invention.

As discussed herein, a third party not actually participating in the videoconference may input closed caption text. For example, a transcriber at a different location listening in on the conversation can input text onto the closed caption page.

As discussed herein, closed caption text can be provided in a multi-party conference. For instance, closed captioning text can be displayed for a conference between two locations, three locations, four locations, and so on. As previously discussed, each location may have a user inputting closed caption text.

Furthermore, the closed caption text can be displayed at one or more locations participating in the conference. For instance, a user may choose to display closed caption text at all locations participating in the conference except for locations two and three. As another example, the user may choose to only display closed captioning text at location five. In other words, closed caption text may be broadcast to as many or as few participants as a user may choose.

In one embodiment of the present invention, a text box may appear within a videoconference display, such as a picture-in-picture box. In this embodiment, a text box appears on the display including closed caption text scrolling down the text box. Accordingly, rather than having closed caption text bar appear on a bottom portion of a videoconference display, such as shown in FIG. 6, a separate box on the picture displays the closed caption text.

Further, two closed caption text boxes may appear on the display, one for the local videoconference device 202 and one for the one or more remote videoconference devices 204. Thus, a picture of the conference participants may include a first and second closed caption text box on the picture. These boxes may include scrolling closed caption text that allows for closed caption text conversations to occur. For example, a first box may include the text "welcome" and the second box may include response scroll text saying "thank you, how are you today," and so on. In an alternative embodiment, the picture-in-picture boxes may be utilized to carry on a conversation that is separate from the videoconference. For instance, a participant at a first location and a participant at a second location may discuss in text what topic should next be discussed, while the remaining participants continue discussions via videoconference on a current topic.

The picture-in-picture boxes may be utilized to indicate conversations at separate locations or conversations among separate participants at a single location. For example, two participants at a particular location may be giving a presentation to participants at one or more remote locations. In this example, two picture-in-picture boxes may be helpful to participants at the one or more remote locations in recognizing which of the presenters is speaking. Any use of the picture-in-picture boxes suitable for use with the present invention may be employed.

As discussed herein, closed caption may be displayed in any language suitable for use with the present invention. For instance, a user may utilize a Japanese language keyboard to enter closed caption text in Japanese. As a result, the closed caption text is displayed as Japanese lettering. Alternatively, a user may be translating the videoconference into a different language and may require a foreign language keyboard. Further, a user may translate foreign languages into English and type in closed caption text in English and/or the foreign language being translated.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for providing closed captioning between at least a first and a second conferencing device, comprising:
    transmitting live audio and video signals from the first conferencing device to the second conferencing device;
    accessing a web page using a data entry device associated with the first conferencing device;
    entering the audio signals as text on the web page using the data entry device; and
    displaying the text on an electronic display associated with the second conferencing device.

2. The method of claim 1, further comprising assigning at least one of a user name and a password to a user, wherein at least one of the user name and the password are required to access the web page.

3. The method of claim 1, further comprising assigning a meeting password to a conference, wherein the meeting password is required to access the web page.

4. The method of claim 3, flyer comprising accessing a user setup page to determine whether a meeting password has been assigned to the conference.

5. The method of claim 1, wherein displaying the text further comprises displaying the text in a history text box.

6. The method of claim 1, wherein the first and second conferencing devices comprise videoconferencing devices.

7. The method of claim 1, wherein accessing the web page comprises the use of an internet protocol address.

8. The method of claim 1, wherein the first and second conferencing devices are connected by a network.

9. The method of claim 1, wherein the electronic display comprises a personal digital assistant.

10. The method of claim 1, wherein the text is displayed on the electronic display in a picture-in-picture box.

11. A method for providing closed captioning between at least a first and a second conferencing device, comprising;
    producing live audio and visual signals at the first conferencing device;
    entering the audio signals as text on a web page; and
    transmitting at least the text and the video to the second conferencing device, and
    displaying the text and the video on an electronic display associated with the second conferencing device.

12. The method of claim 11, further comprising assigning at least one of a user name and a password to a user, wherein at least one of the user name and the password are required to access the web page.

13. The method of claim 11, further comprising assigning a meeting password to a particular conference, wherein the meeting password is required to access the web page.

14. The method of claim 13, further comprising accessing a user setup page to determine whether a meeting password has been assigned to the conference.

15. The method of claim 11, wherein displaying the text further comprises displaying the text in a history text box.

16. The method of claim 11, wherein die first and second conferencing devices comprise videoconference devices.

17. The method of claim 11, wherein entering the audio signals as text on a web page comprises the use of an internet protocol address.

18. The method of claim 11, wherein the first and second conferencing devices are connected by a network.

19. The method of claim 11, wherein the electronic display comprises a personal digital assistant.

20. The method of claim 11, wherein the text is displayed on the electronic display in a picture-in-picture box.

21. An electronically-readable medium having embodied thereon a program, the program being executable by a machine to perform method steps for providing closed captioning in a videoconference environment, the method steps comprising:
    transmitting live audio and video signals from the first conferencing device to the second conferencing device;
    accessing a web page using a data entry device associated with the first conferencing device;
    entering the audio signals as text on the web page using the data entry device; and
    displaying the text on an electronic display associated with the second conferencing device.

* * * * *